W. A. KIRBY.
Harvester.
No. 1,494. Reissued June 9, 1863.
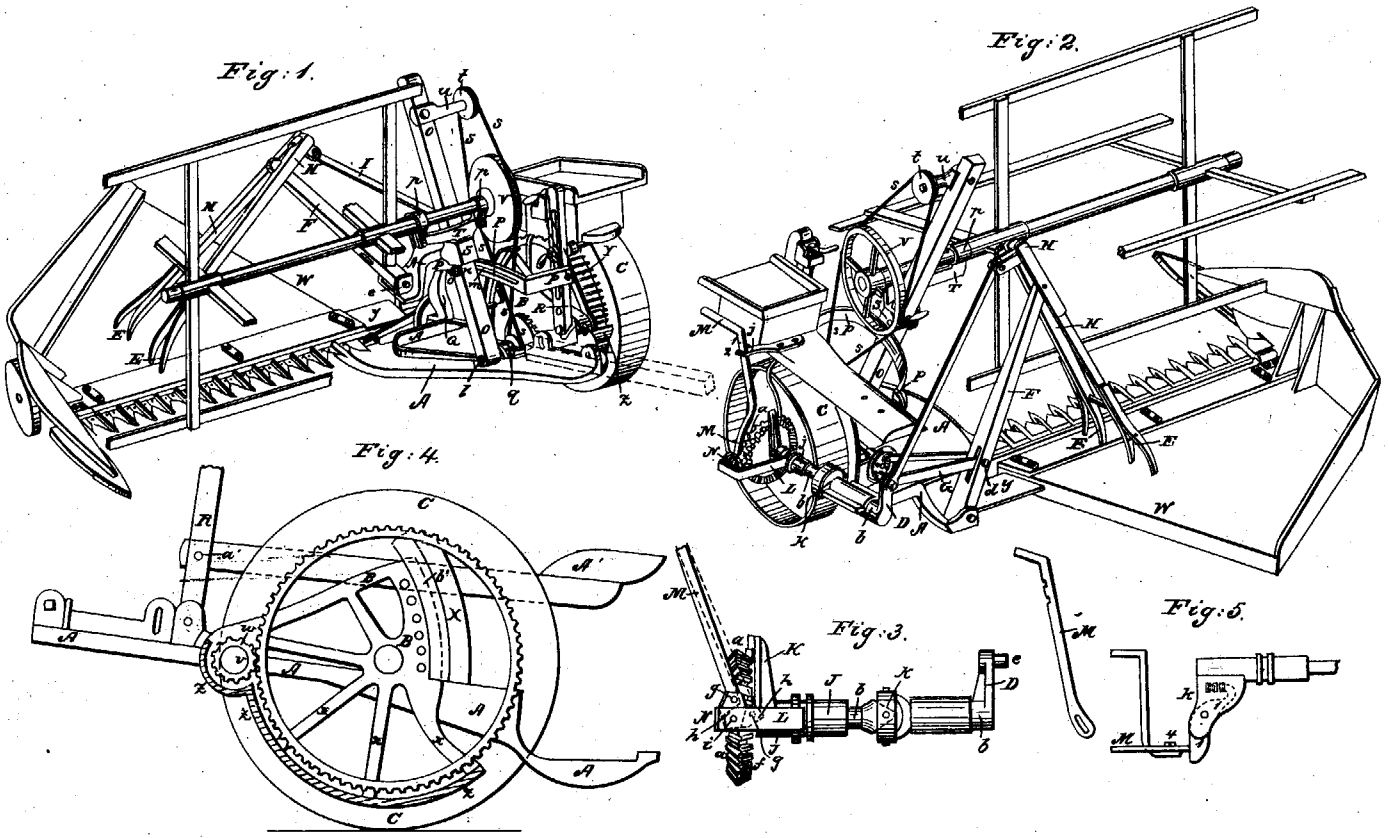
Witnesses:
J. Cohen
John Shirk.
Inventor:
William A. Kirby.
By atty A.R. Stoughton.
N. PETERS, Photo-Lithographer, Washington, D. C.

UNITED STATES PATENT OFFICE.

WILLIAM A. KIRBY, OF BUFFALO, AND DAVID M. OSBORNE, OF AUBURN, NEW YORK, ASSIGNEES OF SAID WM. A. KIRBY.

IMPROVEMENT IN HARVESTING-MACHINES.

Specification forming part of Letters Patent No. 32,736, dated July 2, 1861; Reissue No. 1,494, dated June 9, 1863.

DIVISION C.

*To all whom it may concern:*

Be it known that WILLIAM A. KIRBY, of Buffalo, in the county of Erie and State of New York, did invent certain new and useful Improvements in Harvesting-Machines and in the Raking Attachments thereof; and we do hereby declare that the following is a full, clear, and exact description of one of his said improvements, reference being had to the accompanying drawings, making a part of this specification, in which—

Figures 1 and 2 represent perspective views of a harvesting-machine, taken, respectively, from the front and rear of said machine. Fig. 3 represents a portion of the rake-gearing detached and on an enlarged scale. Fig. 4 represents a side view of the main frame and main driving-wheel, to show the manner of arranging the shields on the frame to protect the gearing that runs close to the ground. Fig. 5 represents a modification of the devices for throwing the rakes in and out of gear with the driving-gear of the machine.

Where cogged gear is used on the drive-wheel of a harvesting-machine, and is of any considerable size or diameter, it is liable to damage by striking against stones or other impediments on the ground. It is, moreover, subject to be clogged up with earth or other harder substances, and to wind up straws, grass, &c., so as to impede its free action.

To provide a remedy or protection against these casualties is the object and purpose of this part of the invention of the said KIRBY; and the invention consists in placing a guard or shield rigidly upon the plate or supplemental frame to which the driving-wheel is attached, and passing it under and partially around the gearing attached to said wheel, so that it shall always retain the same relative position to said wheel and gearing as the positions of the main frame and finger-bar are changed for cutting high or low, the purpose of the guard or shield being to keep the gearing clear of dirt, stones, or other obstructions.

To enable others skilled in the art to make and use this invention, we will proceed to describe the same with reference more particularly to Fig. 4 of the drawings.

A represents a main frame, to which the finger-bar, cutting apparatus, platform, reel, and a portion of the driving-gear are connected; and B is a supplemental or segmental frame pivoted to the main frame A, this frame B having the main driving and supporting wheel C, as well as the driver'seat and some of the gearing, connected with it.

The drawings represent the harvesting-machine in all its details. We shall only specifically describe those parts of it more immediately connected with this part of the invention herein set forth and stated as the part to be claimed under this application.

The supplemental frame B, that carries the drive-wheel C, is pivoted or hinged to the main frame at a point, *v*, which point is also the center of the pinion *w*, that is driven by the main drive-wheel, so that the latter, as it rises and falls, rolls around the pinion and always keeps in gear with it. The rear of the supplemental frame is in arc of a circle, and moves in or against an arc, X, on the main frame, so that by means of a pin the two frames may be held or their motion controlled, or, by the removal of the pin, move independently of each other, as either may happen to be influenced by the ground over which they or any of their connected parts may, for the time being, be moving.

The cogged gear Y on the drive-wheel C runs close to the ground, and is liable to be injured by stones or other obstructions, or to become clogged with dirt, straws, grass, &c. So, also, the pinion *w* is liable to damage, and particularly to catching and winding up straws, grass, &c., and a guard or shield has been devised to protect them from these contingencies. This guard could not be on the main frame, because the drive-wheel rises and falls independent of said main frame; or said main frame must be raised or lowered at times on the auxiliary frame to regulate the height at which the cutters are to work, and one would thus interfere with or fail to be a protection to the other; but this the said KIRBY has effectually provided for. He cast or permanently attached to the supplemental frame B, by means of arms *x*, the shield Z, which is so shaped as to curve around in close proximity to the periphery of the cog-gear Y, and protect it from injury and from clogging. The shield is extended also around the pinion *w* to protect it from like casualties. This can be done notwithstanding that this pinion is on the main frame, because the center of motion of the supplemental frame B, to which the shield Z is attached, and the center of motion of the pinion *w*, are one and the same, and hence the portion of the shield around the pinion will always maintain a fixed relative position to said pinion, however much the two frames A B, each carrying a portion of the gears, may play or be moved one upon the other, as the common center of motion of the several parts are all at the point *v*.

Having thus fully described the nature, object, and purpose of this part of the said KIRBY'S invention, what is claimed under this patent is—

Placing or making a guard or shield upon a supplemental frame or plate to which the driving wheel is attached, and passing it under and partially around the gearing attached to said wheel, to protect it from injury or from being clogged, substantially as described.

WM. A. KIRBY.
D. M. OSBORNE.

Witnesses:
JOHN H. OSBORNE,
CHAS. H. GARLOCK.